United States Patent Office 3,013,771
Patented Dec. 19, 1961

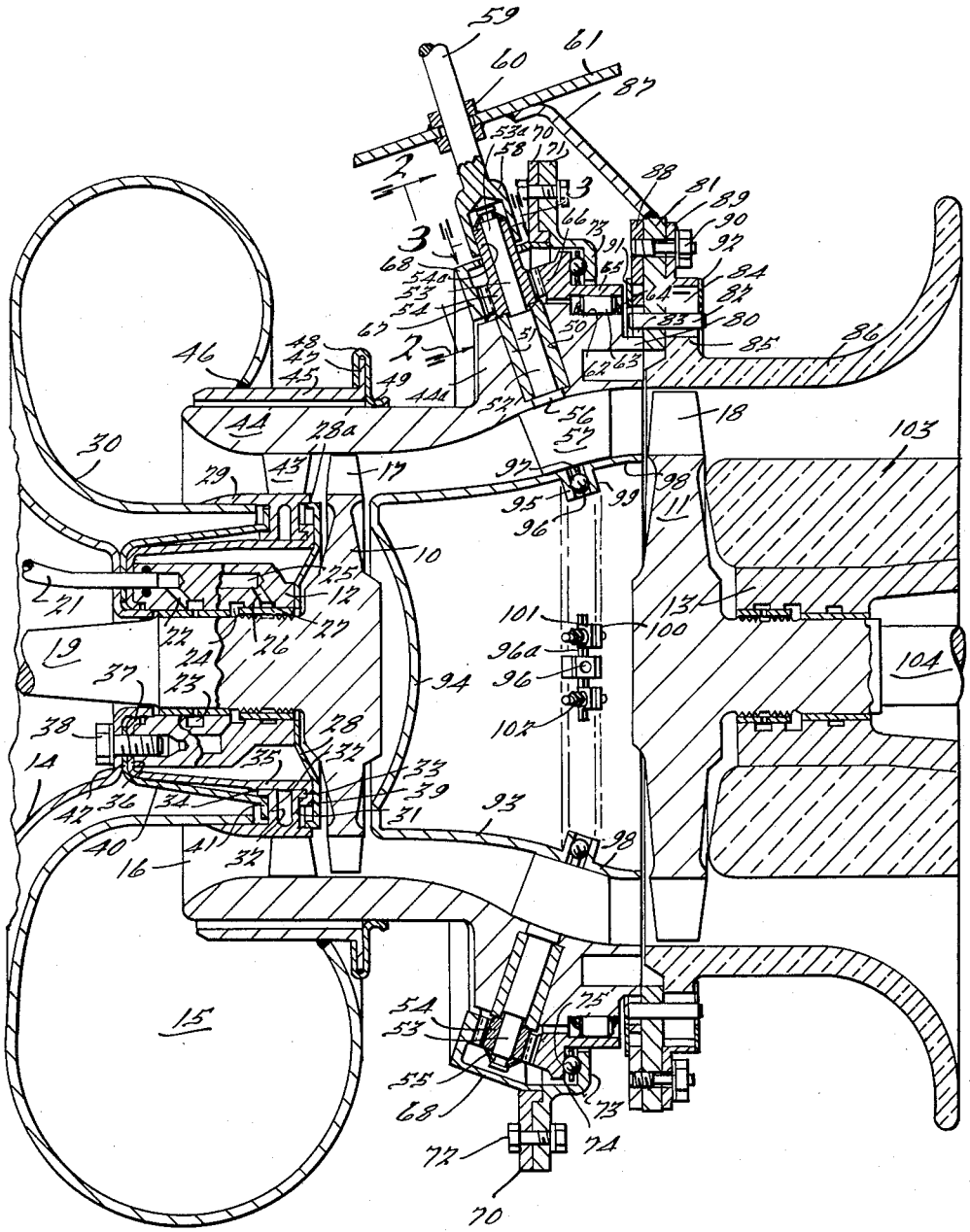

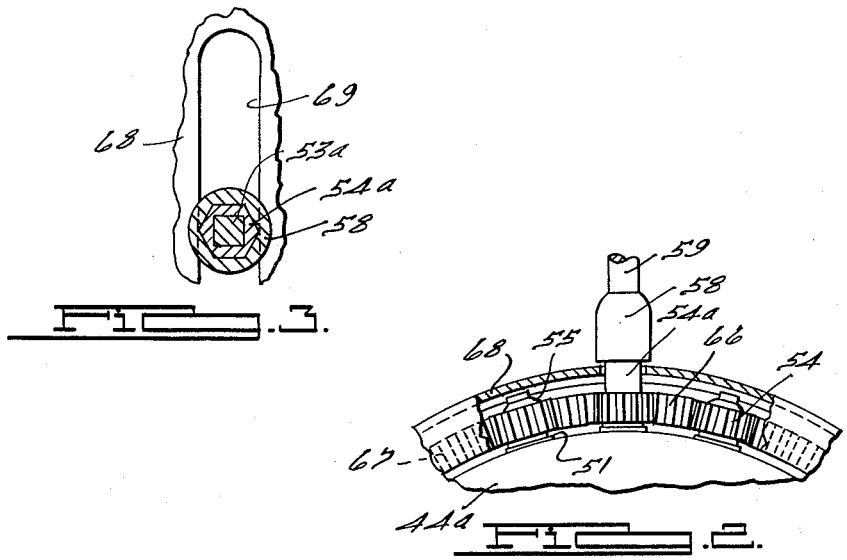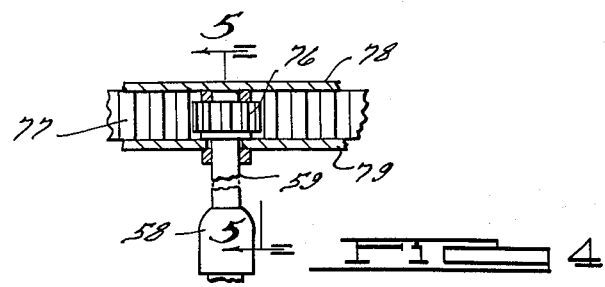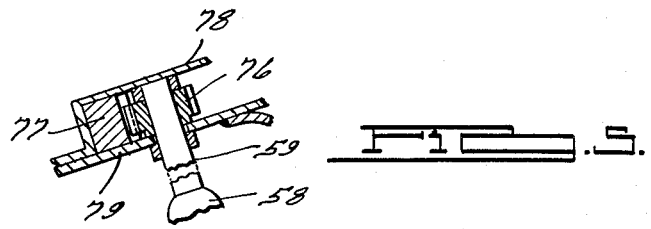

3,013,771
ADJUSTABLE NOZZLES FOR GAS TURBINE ENGINE
Willi Henny, Southfield, Mich., assignor to Chrysler Corporation, Highland Park, Mich., a corporation of Delaware
Filed Oct. 18, 1960, Ser. No. 63,311
9 Claims. (Cl. 253—59)

This invention relates to gas turbine engines and in particular to an improved mechanism for pivotally adjusting the flow directing nozzles for the rotor blades of an automotive gas turbine engine.

In a common type of automotive gas turbine engine, an annular passage conducts motive gases to the peripheral blades of a rotor to drive the same. A plurality of pivotally adjustable flow directing nozzles spaced circumferentially within the passage adjacent the rotor blades suitably determine the angle of contact between the motive gases and the rotor blades in accordance with the speed and load conditions of the rotor.

An object of the present invention is to provide an improved balanced self-contained mechanism for pivotally adjusting the flow directing nozzles, which does not exert an objectionable torque on the nozzle supporting structure tending to rotate the latter around the rotor axis.

Another and more specific object is to provide an adjusting mechanism of the above character comprising a pinion gear secured to each nozzle coaxially with its axis of pivotal adjustment. A pair of ring gears are arranged in mesh with each of the pinion gears at diametrically opposite sides thereof to rotate all of the pinion gears and thereby to pivotally adjust all of the flow directing nozzles in unison upon rotation of said ring gears in opposite directions. One of the pinion gears comprising a driving gear is keyed coaxially to a shaft rotatably supported by the engine housing and suitably connected with means for rotating the shaft in accordance with the speed and load requirements of the rotor. Said one or driving pinion in mesh at diametrically opposite sides with said two ring gears is thus rotated to rotate said ring gears in opposite directions, thereby to pivotally adjust all of the flow directing nozzles in unison.

Another object is to provide such an adjustment mechanism wherein one of the ring gears is rotatably supported by the outer wall of the annular passage for the motive gases and in turn supports the other ring gear, the two ring gears providing mutually opposing thrust bearing supports arranged in overlapping relation to prevent movement of said ring gears radially with respect to said pinion gears out of mesh therewith.

By virtue of the foregoing structure, the rotational adjustment force on the shaft keyed to said one or driving pinion gear is taken entirely by the engine housing. The adjustment force applied to the pinion gears is balanced at opposite sides of the latter, so that no unbalanced component of this force exists to rotate the outer wall of the gas passage around the axis of the rotor. Also by reason of the mutually opposing bearing surfaces of the annular gears, these gears are maintained in alignment with respect to each other independently of thermally induced variations in the alignment of the separate parts of the engine housing, such as the part which supports the outer wall of the annular gas passage and the part which supports the rotor.

Other objects of this invention will appear in the following description and appended claims, reference being had to the accompanying drawings forming a part of this specification wherein like reference characters designate corresponding parts in the several views.

FIGURE 1 is a fragmentary mid-sectional view through a 2-stage gas turbine engine embodying the present invention, taken substantially along the common axis of the engine rotors.

FIGURE 2 is a fragmentary elevational view taken in the direction of the arrows substantially along the line 2—2 of FIGURE 1, portions of one ring gear being broken away to show details of construction.

FIGURE 3 is a fragmentary sectional view taken in the direction of the arrows substantially along the line 3—3 of FIGURE 1.

FIGURE 4 is a fragmentary sectional view showing the gear rack and pinion for operating the nozzle adjustment mechanism.

FIGURE 5 is a fragmentary sectional view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a gas turbine engine embodying the present invention is illustrated by way of example comprising first and second stage rotors 10 and 11 respectively, mounted coaxially in bearing supports 12 and 13 which in turn are suitably mounted in and supported by fixed portions of the engine structure, including a sheet metal compressor turbine support 14, but not otherwise illustrated in detail. A typical automotive gas turbine engine of the type with which the present invention is concerned is illustrated in detail in the Huebner et al. Patent No. 2,795,928. It will suffice herein to state that pressurized combustion supporting air is discharged from an engine driven compressor, preheated by a regenerator, admixed with fuel which is burned in a combustion chamber to supply the driving energy, and then conveyed into a spiral collection chamber 15 from which the hot motive gases are discharged into an annular gas passage 16 defined by inner and outer shrouds described in more detail below. The motive gases flow through passage 16 in the direction of the arrows past the blades 17 and 18 of the rotors 10 and 11 respectively to drive the same and are thence discharged to a regenerator which transfers the usable remaining exhaust heat from the exhaust gases to the inlet combustion supporting air.

In the present instance, the first stage rotor 10 is mounted on a coaxial shaft 19 journalled in the bearing support 12 and operably connected with a compressor for supplying the aforesaid inlet air. A lubricating conduit 21 carries pressurized lubricating fluid into support 12 and thence via duct 22 to an annular oil inlet groove 23 adjacent the bearing structure of support 12 to lubricate the bearing for shaft 19. An oil return groove 24 associated with the bearing structure for shaft 19 collects the lubricating oil and discharges the same to a reservoir by conduit means similar to duct 21.

Similarly, pressurized cooling air is conveyed by duct 25 into support 12 and thence by branch duct 26 to an annular air inlet groove 27, from which the cooling air flows axially along shaft 10 toward rotor 10, through the central opening of an annular sealing plate 28 and thence radially outwardly between the latter and rotor 10 to the annular passage 16. Plate 28 is suitably secured to support 12. Thus the heat which tends to flow radially inward in rotor 10 from the blades 17 exposed to the hot motive gases is dissipated to prevent undue thermal distortion of the rotor.

Immediately upstream of the first stage rotor blades 17 is an annular inner shroud section 29 comprising a plurality of circumferentially extending segments which overlap a juxtaposed portion of the sheet metal closure 30 defining chamber 15. The downstream edge of the inner shroud section 29 overlaps an end flange 28a of plate 28 in fluid sealing relationship. Each segment of the shroud section 29 is provided with a pair of radially inwardly extending legs 31 and 32 having footings 33 and 34 respectively, supported by a conically shaped support 35. The smaller left end of support 35 terminates in an annular inturned base 36 which in turn terminates in an axially directed annular flange 37 seated within a mating locating notch in support 12. A plurality of bolts 38 screwed into support 12 through the base 36 secure the support 35 in position. The large or right end of conical support 35 terminates in an outturned and reversely bent annular hook portion 39 which extends closely around the footings 33 of the legs 31 to retain the latter and shroud section 29 firmly in position. An outer conical support 40 tightly overlies the footings 34 of legs 32 to hold the latter snugly against support 35 and terminates in an annular outturned flange 41. The radially outer edge of flange 41 resiliently engages the footings 32 in fluid sealing relation and urges the footings 33 axially into seated engagement with the hook portion 39. The smaller end of conical support 40 terminates in an annular inbent flange 42 overlapping the base 36 and secured against the latter by the bolts 38.

Integral with the segments of the inner shroud section 29 are a plurality of fixed nozzles 43 arranged in circumferentially spaced relationship within the annular passage 16. An annular outer shroud section 44 is supported on the outer ends of the blades 43 and is provided with an annular radial enlargement 44a at its downstream end. A sleeve 45 of slightly greater diameter than the outer circumference of shroud 44 extends coaxially around the latter and is secured as for example by welding at 46 to the closure 30. The downstream edge of sleeve 45 terminates in a radial annular flange 47 confined in fluid sealing engagement within an annular rounded resilient channel seal 48 having an annular sealing portion 49 resiliently engaging the outer surface of shroud 44 to effect a fluid seal therewith.

Extending perpendicularly to the inner surface of the outer shroud section 44 at the region of the enlargement 44a and uniformly spaced around the circumference of the latter are a plurality of bores 50 for a corresponding plurality of bushings 51. The axes of the bushings 51 define a conical envelope coaxial with the rotors 10 and 11, the bushings 51 being suitably secured within their respective bores 50, as for example by being brazed or press fitted into position. Extending through each bushing 51 and journalled therein for rotation coaxially with the corresponding bore 50 is a spindle 52 having its radially outer end 53 splined coaxially to the hub of a pinion gear 54. A C-type spring 55 secured within a groove at the outer end of each spindle 52 resiliently urges each pinion gear 54 against the outer end of the associated bushing 51 and simultaneously yieldingly urges the spindle 52 outwardly. The lower end of each spindle 52 is provided with an annular enlargement 56 which seats against the adjacent inner end of the bushing 51 to provide an annular fluid seal around the lower end of the spindle 52, thereby to prevent flow of gases from passage 16 between the enlargement 56 and bushing 51 and thence outwardly along spindle 52. Inwardly of each enlargement 56 is an adjustable nozzle blade 57 which projects into the annular passage 16 immediately upstream of the rotor blades 18. By rotating the nozzle blades 57 about the axes of their respective spindles 52, the angle of attack of the motive gases in passage 16 against the blade 18 can be predetermined.

The hub of one of the pinions 54 extends radially outwardly at 54a and terminates in a splined connection within an internally splined socket element 58 integral with the radially inner end of a pivotal shaft 59, FIGURES 1 and 3. The splined extension of the associated spindle 52 is correspondingly lengthened radially at 53a.

The shaft 59 extends through and is journalled in a bushing 60 supported by a fixed portion 61 of the engine. Thus upon rotation of shaft 59, the associated pinion 54 and spindle 52 are rotated.

Integral with the shroud enlargement 44a is a cylindrical roller support 62 on which ride a plurality of circumferentially spaced rollers 63. The latter are maintained in spaced relationship by means of a circular cage 64 around the cylindrical support 62 and loosely confining the rollers 63. Journalled on the rollers 63 is a rotatable adjustable sleeve 65 integral with a ring gear 66 coaxial with rotor 11. The teeth of gear 66 are arranged in a conical envelope to mesh with the teeth of each of the pinion gears 54 at their right-hand peripheral portions in FIGURE 1.

Meshing with the teeth of each of the pinion gears 54 diametrically opposite gear 66 is a second ring gear 67 having an integral bracket portion 68 which extends transversely across the axes of the spindles 52 at a location outwardly thereof. At the region of the radially elongated spine 53a associated with the gear hub 54a, the bracket portion 68 is provided with a circumferentially extending slot 69 through which the hub 54a extends, FIGURE 3, to enable rotational nozzle adjusting movement of ring gear 67 and its bracket portion 68 coaxially with rotor 11, as described below. At the right of the pinions 54, the bracket portion 68 is suitably secured, as for example by welding, to an annular clamp ring 70 which is secured to a mating ring 71 by a plurality of bolts 72. Ring 71 is formed integrally with an annular thrust bearing race 73 which overlaps and confronts an opposing thrust bearing race 74 formed integrally with the back side of ring gear 66. An annularly arranged ball bearing 75 closely spaces the bearing races 73 and 74 to facilitate rotation of the gears 66 and 67 coaxially around shroud 44.

By virtue of the arrangement of the bracket 68 and the rings 70 and 71, the thrust bearing races 73 and 74 are maintained in mutually opposing relation to prevent movement of either of the ring gears 66 and 67 radially from their meshing engagement with the pinion gears 54. Also by the arrangement shown, ring gear 66 is supported by the annular shroud surface 62 and in turn supports ring gear 67 by means of the balls of the bearing 75 partially seated in mating annular grooves or bearing seats formed coaxially in the confronting surfaces of the bearing races 73 and 74.

In order to adjust the nozzles 57, the upper end of shaft 59 is keyed to a pinion 76 in mesh with a reciprocable gear rack 77, the latter and upper end of shaft 59 being suitably supported by fixed frame portions 78 and 79 of the engine, FIGURES 4 and 5. Upon linear movement of rack 77, which may be controlled either manually or automatically in response to speed and load conditions of the vehicle and engine, pinion 76 is rotated to rotate shaft 59, hub 54a, and the associated spindle 52 and pinion gear 54, which latter rotates the ring gears 66 and 67 in opposite directions to rotatably adjust all of the pinions 54 and associated spindles 52 and nozzles 57 in unison. The torque imparted to the ring gear 66 is balanced by an equal torque imparted to ring gear 67, so that no resultant rotational force is imparted to shroud 44 from the operation of gear rack 77 and shaft 59. The reaction thrust of rack 77 against pinion 76 is sustained by the fixed engine frame members 78, 79, and 61. In this latter regard, shaft 59 is sufficiently flexible to accommodate limited thermally induced misalignment between the bushing 60 and the journal mounting for the upper end of shaft 59 in frame members 78 and 79, FIGURE 4.

The outer shroud enlargement 44a is also provided with a radial flange 80 which abuts an annular bulkhead flange 81 in fluid sealing relation. The flange 81 is arranged coaxially with the axis of rotors 10 and 11 and locates the flange 80 coaxially therewith by means of at least three axially extending dowels 82 secured to flange 81 at uniformly spaced locations around the latter and extending snugly into radial slots 83 in the flange 80. The foregoing structure thus accommodates relative thermal expansion between the hot shroud 44 and the comparatively cooler flange 81 while at the same time maintaining these members in coaxial relationship.

Similarly, the axial dowels 82 extend snugly through radial slots 84 in the annular flange 85 of an annular ceramic terminal outer shroud section 86 to maintain the latter in coaxial alignment with shroud section 44 and flange 81 while permitting relative thermal expansion between the latter and the shroud section 86. Flange 81 comprises part of the engine's fixed structure and is secured to the engine housing by a bulkhead 87 welded to bulkhead 61. Annular flanges 88 and 89 are secured to opposite sides of flange 81 by bolts 90, the inner edges of the flanges 88 and 89 being suitably secured to resilient annular spring retainers 91 and 92 respectively, which overlie the peripheral edges of the flanges 80 and 85 respectively to hold the latter snugly against flange 81 in fluid sealing relation to prevent leakage of the motive gases radially between these flanges.

Arranged between the rotors 10 and 11 is a two-part interstage inner shroud section including a downstream cup-shaped portion having an annular inner shroud part 93 closed at its downstream end by a cup base 94. A plurality of circumferentially spaced flanges 95 are directed inwardly from adjacent the downstream edge of the shroud part 93, each flange 95 resiliently engaging a side of one of each of a plurality of ball elements 96. Each ball element 96 is integrally secured to the inner end of one of each of the adjustable nozzles 57 by means of an inwardly extending shank 97 coaxial with the axis of rotation of the associated spindle 52.

The second portion of the interstage inner shroud section comprises an annular part 98 terminating at its downstream edge in a plurality of circumferentially spaced inturned flanges 99 resiliently engaging the balls 96 in opposition to the flanges 95. Alternating with the flanges 99 are a plurality of inturned flanges 100 of the shroud part 98, the flanges 100 mating with parallel inturned flanges 101 of the upstream edge of the inner shroud part 93 and being secured thereto by a plurality of bolt and nut assemblies 102.

In order to assure proper alignment of the outer circumferential surfaces of the shroud parts 93 and 98, at least three of the bolts in the assemblies 102 are machined to fit precisely within holes in the flanges 100 and 101 through which they pass. Also to prevent rotational movement of the shroud section 93, 98 with respect to the ball elements 96 and to maintain the latter located between the resilient flanges 95 and 99, a few sets of spacers 96a secured in position by the nut and bolt assemblies 102 at uniformly spaced locations around the shroud section 93, 98 are provided with extensions directed toward opposite sides of the adjacent ball elements 96. Each pair of flanges 95 and 99 extend in parallelism with the axis of rotation of the spindle 52 of the associated ball element 96 and resiliently grip the latter therebetween to hold the inner shroud section 93, 98 in position. By virtue of the plurality of ball elements 96 spaced uniformly around the axis of the passage 16, a substantially uniform supporting force around the circumference of the shroud section 93, 98 is applied thereto to maintain the latter in position, slight deviations in the resilient force of the flanges 95 and 99 against the balls 96 being averaged out and rendered inconsequential. The flanges 99 and 100 extend in a conical surface along the circular line of contact between the ball elements 96 and flanges 99, and parallel to the conical plane through the axes of the several spindles 52, thereby to simplify the structure of the downstream interstage shroud part 98. By virtue of the stems 97 spacing the ball elements 96 inwardly from the nozzles 57, the ball elements 96 are located in contact with the resiliently yieldable inner ends of the flanges 95 and 99 and sufficiently inwardly of the annular shroud parts 93 and 98 to prevent buckling of the latter regardless of the clamping engagement between the ball elements 96 and the flanges 95 and 99.

Downstream of rotor 11, the inner shroud for the passage 16 is completed by an annular ceramic shroud section 103 suitably secured in position on the bearing support 13. The rotor 11 is provided with a shaft 104 journalled within the support 13 and operably connected with the vehicle wheels to drive the same. The lubrication and air cooling of rotor 11 and its bearing structure is essentially the same as for rotor 10 and is accordingly not described in detail.

In accordance with the structure shown, the outer shroud sections 44 and 86 form a continuous annular outer wall for the passage 16. The inner shroud sections 29 and 93 extend in juxtaposition with the upstream and downstream edges respectively of the periphery of rotor 10 at the base of its blades 17 to provide a smooth substantially continuous portion of the inner wall of passage 16. Similarly the inner shroud sections 98 and 103 extend in juxtaposition with the upstream and downstream edges respectively of the periphery of the rotor 11 at the base of the latter's blades 18 to complete the substantially continuous inner wall for the passage 16. The inner and outer ends of the nozzles blades 57 are shaped spherically about radii extending along the axes of their associated spindles 52 and centered at the intersection of these radii on the axis of the rotors 10 and 11. Correspondingly, at the regions of the blades 57, the juxtaposed portions of the outer shroud section 44 and inner shroud section 93, 98 are formed spherically about radii similarly centered. Thus upon pivotal adjusting movement of the blades 57, the clearance between their inner and outer edges and the adjacent inner and outer shroud sections will remain the same.

What is claimed is:

1. In a gas turbine engine having a rotor and an annular passage for conducting motive gases to said rotor, a plurality of adjustable nozzles spaced circumferentially within said passage upstream of said rotor, each nozzle having a radial stem and being adjustably pivotal therewith about the axis of the latter, a plurality of pinion gears, one being keyed to the stem of one of each of said nozzles to pivot said stem, two annular gears extending around said passage and being in mesh with each pinion gear at opposite sides thereof respectively to rotate the same upon rotation of said annular gears in opposite directions, annular thrust bearing means extending around said passage and carried by said annular gears to oppose thrust thereon tending to urge the same out of mesh with said pinion gears, and actuating means operably connected with the stem of one of said nozzles to pivot the same to rotate the associated pinion gear and thereby to rotate said annular gears in opposite directions.

2. In a gas turbine engine having a rotor and means for conducting motive gases to said rotor, a plurality of adjustable nozzle spaced circumferentially about the axis of said rotor in juxtaposition therewith, each nozzle having a generally radially extending stem and being pivotally adjustable about the axis of its stem upon pivoting of the latter, a separate pinion gear keyed to each stem to pivot the same, first and second annular gears extending around the axis of said rotor and being in mesh with each pinion gear at opposite sides thereof to rotate the same upon rotation of said first and second annular gears in opposite direction, said first and second annular gears having mutually opposing thrust sustaining means arranged about the axis of said rotor to oppose movement of said annular gears to positions out of mesh with said pinion gears.

3. In a gas turbine engine having a supporting frame, a rotor mounted in said frame, and means provided by said frame for conductnig motive gases to said rotor, a plurality of adjustable nozzles carried by said frame and spaced circumferentially about the axis of said rotor in juxtaposition therewith, each nozzle having a generally radially extending stem and being pivotally adjustable about the axis of its stem upon pivoting of the latter, a separate pinion gear keyed to each stem to pivot the same, first and second annular gears extending around the axis of said rotor and being in mesh with each pinion gear at opposite sides thereof to rotate the same upon rotation of said first and second annular gears in opposite directions, said first and second annular gears having mutually opposing thrust sustaining means arranged about the axis of said rotor to oppose movement of said annular gears to positions out of mesh with said pinion gears, bearing means arranged around the axis of said rotor and carried by said frame, said bearing means rotatably supporting one of said annular gears, said thrust sustaining means being supported by said one annular gear and in turn rotatably supporting the other of said annular gears.

4. In a gas turbine engine having a rotor and means for conducting motive gases to said rotor, a plurality of adjustable nozzles spaced circumferentially about the axis of said rotor in juxtaposition therewith, a plurality of pinion gears, means connecting each pinion gear with one of each of said nozzles to turn the same upon turning of said pinion gear, first and second annular gears extending around the axis of said rotor and being in mesh with each pinion gear at opposite sides thereof to rotate the same upon rotation of said first and second annular gears in opposite directions, said first and second annular gears having mutually opposing thrust sustaining means arranged about the axis of said rotor to oppose movement of said annular gears in directions radially outward with respect to the axis of each pinion gear.

5. In a gas turbine engine having a supporting frame, a rotor mounted in said frame, and means for conducting motive gases to said rotor, a plurality of adjustable nozzles spaced circumferentially about the axis of said rotor in juxtaposition therewith, a plurality of pinion gears, means connecting each pinion gear with one of each of said nozzles to turn the same upon turning of said pinion gear, first and second annular gears extending around the axis of said rotor and being in mesh with each pinion gear at opposite sides thereof to rotate the same upon rotation of said first and second annular gears in opposite directions, said first and second annular gears having mutually opposing thrust sustaining means arranged about the axis of said rotor to oppose movement of said annular gears in directions radially outward with respect to the axis of each pinion gear, supporting means carried by said frame and arranged around the axis of said rotor, said supporting means rotatably supporting one of said annular gears, said thrust sustaining means being supported by said one annular gear and in turn rotatably supporting the other of said annular gears.

6. In a gas turbine engine having a rotor and an annular passage for conducting motive gases to said rotor, a plurality of adjustable nozzles spaced circumferentially within said passage in juxtaposition with said motor, a stem connected with each nozzle to pivot the same and extending generally radially through the outer wall of said passage, each stem being pivotally supported by said wall for pivotal movement about the stem axis, a plurality of pinion gears, one pinion gear being secured to each stem to pivot the same, a pair of annular gears extending around said passage and being in mesh with each pinion gear at opposite sides thereof respectively to rotate all of said pinion gears in unison upon rotation of said annular gears in opposite directions, said annular gears having interengaging mutually opposing thrust sustaining means arranged about said passage to limit movement of said annular gears to positions out of mesh with said pinion gears, and actuating means operably connected with one of said shafts for selectively pivoting the same to rotate said annular gears in opposite directions.

7. In a gas turbine engine having a rotor and an annular passage for conducting motive gases to said rotor, a plurality of adjustable nozzles spaced circumferentially within said passage in juxtaposition with said rotor, a stem connected with each nozzle to pivot the same and extending generally radially through the outer wall of said passage, each stem being pivotally supported by said wall for pivotal movement about the stem axis, a plurality of pinion gears, one pinion gear being secured to each stem to pivot the same, a pair of annular gears extending around said passage and being in mesh with each pinion gear at opposite sides thereof respectively to rotate all of said pinion gears in unison upon rotation of said annular gears in opposite directions, thrust sustaining means arranged about said passage to limit movement of said annular gears to positions out of mesh with said pinion gears, said thrust sustaining means including roller means and mutually opposing interengaging annular parts of said annular gears spaced by said roller means and in rolling engagement therewith to enable said annular gears to rotate in opposite directions, and actuating means operably connected with one of said shafts for selectively pivoting the same to rotate said annular gears in opposite directions.

8. In a gas turbine engine having a rotor and an annular passage for conducting motive gases to said rotor, a plurality of adjustable nozzles spaced circumferentially within said passage in juxtaposition with said rotor, a stem connected with each nozzle to pivot the same and extending generally radially through the outer wall of said passage, each stem being pivotally supported by said wall for pivotal movement about the stem axis, a plurality of pinion gears, one pinion gear being secured to each stem to pivot the same, a pair of annular gears extending around said passage and being in mesh with each pinion gear at opposite sides thereof respectively to rotate all of said pinion gears in unison upon rotation of said annular gears in opposite directions, said annular gears having interengaging mutually opposing thrust sustaining means arranged about said passage to limit movement of said annular gears to positions out of mesh with said pinion gears, annular bearing means carried by said outer wall and rotatably supporting one of said annular gears, said thrust sustaining means being supported by said one annular gear and in turn rotatably supporting the other of said annular gears, and actuating means operably connected with one of said shafts for selectively pivoting the same to rotate said annular gears in opposite directions.

9. In a gas turbine engine having a rotor and an annular passage for conducting motive gases to said rotor, a plurality of adjustable nozzles spaced circumferentially within said passage in juxtaposition with said rotor, a stem connected with each nozzle to pivot the same and extending generally radially through the outer wall of said passage, each stem being pivotally supported by said wall for pivotal movement about the stem axis, a plurality of pinion gears, one pinion gear being secured to each stem to pivot the same, a pair of annular gears extending around said passage and being in mesh with each pinion gear at opposite sides thereof respectively to rotate all of said pinion gears in unison upon rotation of said annular gears in opposite directions, thrust sustaining means arranged about said passage to limit movement of said annular gears to positions out of mesh with said pinion gears, said thrust sustaining means including roller means and mutually opposing interengaging annular parts of said annular gears spaced by said roller means and in rolling engagement therewith to enable said annular gears to rotate in opposite directions, annular bearing means carried by said outer wall and rotatably supporting one of said annular gears, said thrust sustaining means being supported by said one annular gear and in turn rotatably supporting the other of said annular gears, and actuating means operably connected with one of said shafts for selectively pivoting the same to rotate said annular gears in opposite directions.

No references cited.

UNITED STATES PATENT OFFICE

CERTIFICATE OF CORRECTION

Patent No. 3,013,771            December 19, 1961

Willi Henny

It is hereby certified that error appears in the above numbered patent requiring correction and that the said Letters Patent should read as corrected below.

Column 2, line 63, for "10", first occurrence, read -- 19 --; column 6, line 27, for "nozzles" read -- nozzle --; line 60, for "nozzle" read -- nozzles --; line 70, for "direction" read -- directions --; column 7, line 1, for "conductnig" read -- conducting --; line 64, for "motor" read -- rotor --.

Signed and sealed this 24th day of April 1962.

(SEAL)
Attest:

ESTON G. JOHNSON
Attesting Officer

DAVID L. LADD
Commissioner of Patents